March 14, 1933. B. G. BUSS 1,901,021
LOCKING CATCH
Filed Nov. 16, 1931 2 Sheets-Sheet 1
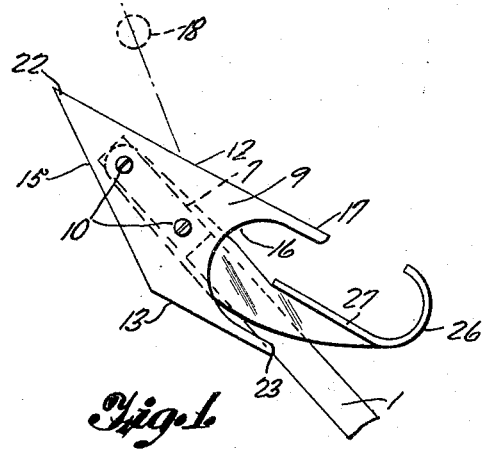
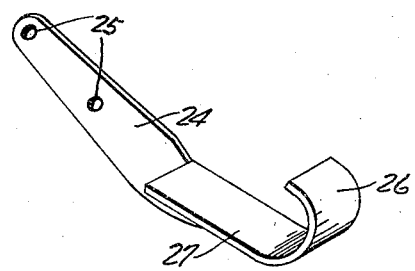
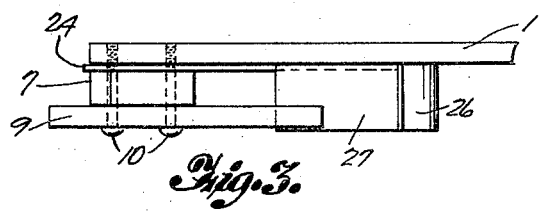
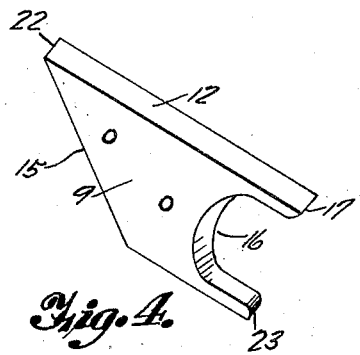
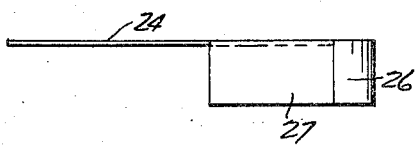
INVENTOR.
Benhard G. Buss
BY Adam E. Fisher
ATTORNEY.

March 14, 1933.  B. G. BUSS  1,901,021
LOCKING CATCH
Filed Nov. 16, 1931  2 Sheets-Sheet 2

INVENTOR.
Benhard G. Buss
BY Adam E. Fisher
ATTORNEY.

Patented Mar. 14, 1933

1,901,021

UNITED STATES PATENT OFFICE

BENHARD G. BUSS, OF GOLDEN, ILLINOIS

LOCKING CATCH

Application filed November 16, 1931. Serial No. 575,231.

This invention is an improvement upon my original invention of this same general nature as shown in Patent Number 1,822,198, dated September 8, 1931.

The general object of the preceding invention is to provide in combination with a conventional form of spring-set movable member B, mounted to swing or move in a fixed path, a resilient arm 1 having one end anchored and its free end disposed adjacent the path of travel of the said movable member, there being an eccentrically formed plate 9 at the free end of the resilient arm adapted to be impinged upon and depressed by a pin 18 extended laterally from the movable member, the said plate having a notch 16 adapted to engage the pin in its travel and releasably lock the said movable member in a position mid-way of its limits of travel. In order to then release the movable member and return same to its original position, the operator further depresses the movable member until the said pin entirely clears the said plate, which then springs up and allows the movable member to return without interruption at the opposite side of the plate to its original position. In that construction it is found in practice that where the member B is moved too rapidly, the pin 18 will pass right on over the notch 16 of the plate 9 without allowing time to stop and locate the pin in the said notch for the purpose of locking the member B in a mid-position between its limits of travel.

It is the prime purpose of the present invention, therefore, to provide an addition to or improvement upon the structure of the said prior invention, to enable that structure to better and more advantageously function as intended.

A further object is to provide for the form of lock plate 9 shown in the prior invention, or any modification thereof, an attachment in the form of a hook which will function to prevent the said pin 18 of the old structure from passing clear over the plate 9 on its first movement, as above described, thereby enabling the device to function as intended.

With these and such other and further objects and advantages in view as may appear from the following specification, attention is now directed to the accompanying drawings as constituting a part thereof and wherein Figure 1 is a portion of the supporting arm 1 and lock plate 9 as involved in the prior invention, my present improvement being shown as attached thereto;

Figure 2 is an enlarged detail view in perspective of the hook, or subject matter of the present invention, as an attachment for the prior invention;

Figure 3 is a top plan view of the assembly shown in Figure 1;

Figure 4 is a detail view in perspective of the modified form of plate 9 of the old structure as preferably employed in the embodiment of the present improvement;

Figure 5 is a top plan view or edge view of the hook shown in Figure 2, the subject matter of the present invention;

Figure 8:
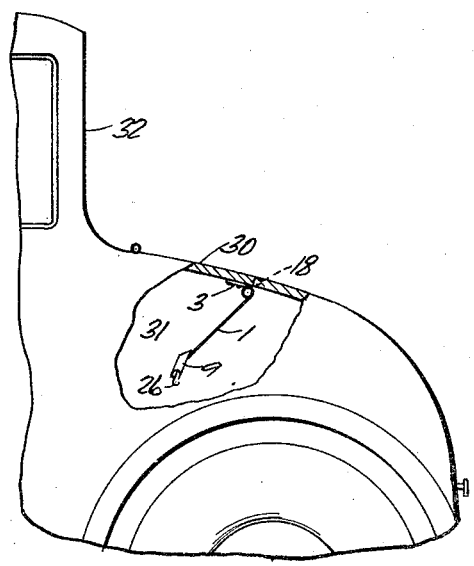

Figure 8 is a view of the rear portion of an automobile of the roadster type, the same having a rear compartment with a hinged lid, my invention being shown mounted in connection therewith as means for releasably supporting the lid in a raised position. In this view the lid is shown closed, and a portion of the casing is shown broken away so as to reveal the arrangement and mounting of my invention upon the lid.

Figure 9:
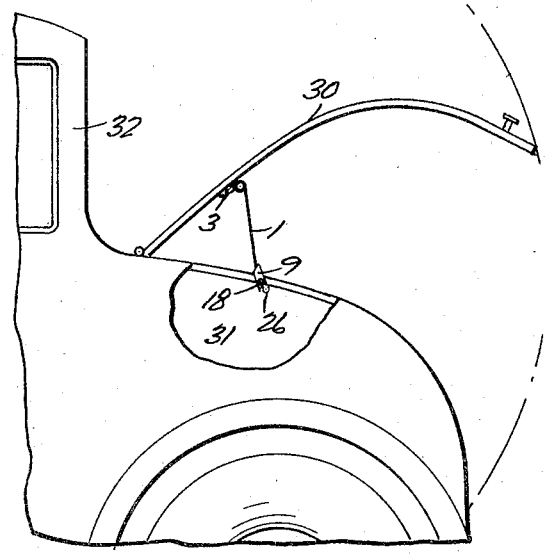

Figure 9 is a view similar to Figure 8, the lid being shown raised and my invention functioning to support it in that position.

Figure 6:
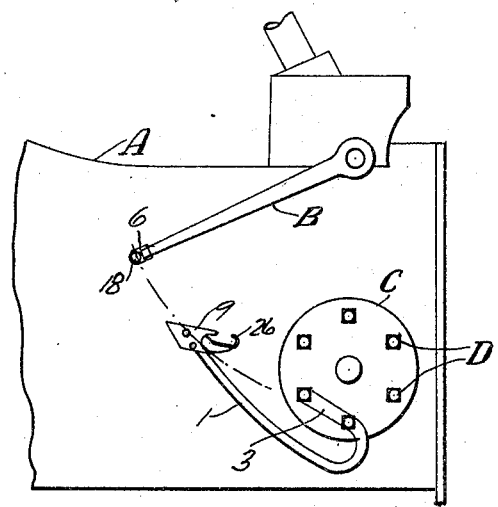
Figure 6 is a side elevation on a reduced scale, showing the combination of the old structure and present improvement, as mounted in connection with the clutch lever of a tractor. The clutch pedal is here shown as out of engagement with the lock plate constituting the subject matter of the prior invention, and here constituting in combination, a part of the present invention.
Figure 7:
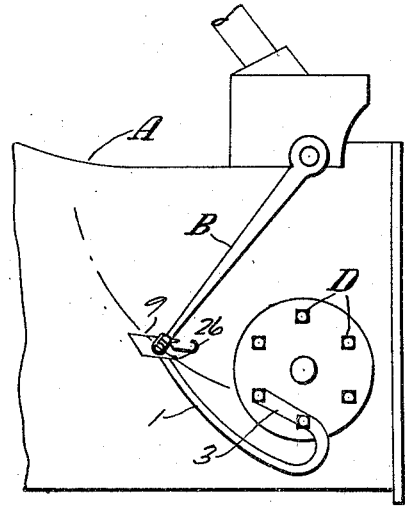
Figure 7 is a view similar to Figure 6, the clutch pedal being here shown as releasably locked in a mid position, or clutch releasing position.

Referring more particularly to the drawings, Figures 1, 6 and 7 illustrate the application of my invention upon the clutch lever B of a tractor for the operation of the clutch therein (not shown). This application is identical with that described in the prior patent. A circular mounting plate C is provided on the side of the housing A forward of and below the clutch lever B, and is secured in place by bolts D. The foregoing arrangements are conventional. The lever B is conventionally spring-set to normally maintain its elevated position shown in Figure 6, in which the clutch elements or parts are in engagement. In the operation of the clutch the lever B is depressed by the operator or driver pressing downward and forward upon the foot rest 6 for the purpose of disengaging the clutch. This pressure of the foot is necessarily continuous where it is desired to keep the clutch continuously disengaged for any length of time, as where the tractor is being used for driving other machinery (not shown) through its power pulley (not shown). For maintaining the clutch in a depressed position for any purpose, my prior invention shows a resilient arm 1 having an end 3 secured to the plate C by bolts D. This arm is extended rearwardly and upwardly adjacent the side of the clutch housing A inside of the path taken by the foot rest 6 of the clutch lever B, when the same is pushed down and forwardly in the operation of the clutch. In the prior structure, a shoulder 7 is laterally extended from the free end of the arm 1 and a lock plate 9 is fastened to the outer side of the shoulder 7 by bolts 10. The plate 9 is angular in formation, the upper and lower margins 12 and 15 thereof meeting rearwardly to form the acute angle 22 which is directed towards the foot rest 6, and the forward margin being cut out to form a notch 16 between the upper and lower points 17 and 23. This plate 9 is arranged in the path of travel of the foot rest 6, and a locking pin 18 is extended inwardly from the foot rest in such a manner that upon the downward and forward movement of the lever B and foot rest 6 as above described, this pin 18 is adapted to strike upon the upper edge 12 of the plate 9 and, depressing the plate, slide on down into the notch 16, to hold the clutch lever B in its disengaging position as shown in Figure 7. In order for the operator to release the clutch lever again for the purpose of reengaging the clutch elements, all that was necessary was for him to further depress the foot rest 6 and cause the pin 18 to pass on down out of the notch 16, whereupon the plate 9 would spring upward and enable the foot rest 6 and pin 18 to return to their original position, for this purpose passing along the under angularly disposed margins 13 and 15 of the plate 9. In the structure and arrangement so far described and which is the subject matter of the said prior invention, there is nothing to prevent the foot rest 6 and pin 18, under a relatively quick impulse of the operator's foot, from jumping entirely over the notch 16 and points 17 and 23 of the plate 9, thereby permitting the lever B and foot rest to immediately return to their original position and without the device functioning at all to the purpose intended, to-wit: for locking the clutch in a disengaged position.

In the present improvement upon the said prior invention, I provide an additional hook plate 24 having bolt holes 25 at one end, and having a hook 26 at the opposite end, the latter being connected with the plate 24 through a somewhat elongated shank portion 27, the plane of which is disposed perpendicularly to the plane of the plate 24. This device is mounted in place by inserting the plate 24 between the arm 1 and shoulder 7 of the structure of the first invention, as clearly shown in Figure 3, and where it is firmly held by the said bolts 10. The elements are so proportioned that when mounted as stated, the hook 26 will stand forward of and somewhat spaced from the upper point 17 of the plate 9, with the axis of the shank portion 27 disposed in the plane of the plate 9. It is now evident that as the pin 18 travels down the edge 12 of the plate 9 and passes off the point 17, the said pin 18 will strike into the hook 26, and the shank 27 will prevent the pin from passing on over the lower point 23 of the plate 9 and returning to its original position without the device functioning as intended. After the pin 18 strikes into the hook 26, the operator relaxes pressure upon the foot rest 6, whereupon the pin 18 passes up into the notch 16, where it is held, and whereby the clutch mechanism is held disengaged. When the operator desires again to engage the clutch, he merely presses down again upon the foot rest 6, whereupon the pin 18 is caused to pass down underneath the shank 27, and upon the foot rest 6 being then released, the spring arm 1 will cause the plate 9 to rise and the pin 18 will travel back along the under sides 13 and 15 of the plate 9 until the foot rest 6 and lever B regain their original position. I have thus provided an effective device for overcoming the objection and defect of the original invention, and in view of its function, this device may be styled a stop or interrupter for a locking catch.

In Figures 8 and 9 is shown an adaptation of the device for the purpose of holding a lid 30 of a compartment 31 of an automobile 32 in raised position. Here the spring arm 1 is anchored at its end 3 to the inner side of the lid and extended downwardly and the plate is mounted at the lower free end of the arm 1. A pin 18 which corresponds to the pin 18 of the first mentioned adaptation to the tractor, is mounted upon the margin of the opening, in such position that the hook 26 will engage the pin as the lid is opened.

As the lid is then released, the pin bears up into the notch 16, whereby the lid is held in its raised position. When it is desired to close the lid, it is again raised free from the pin 18, which then passes to the other side of the shank 27 of the locking device and around the point 23, thus allowing the lid to be closed. Numerous other applications of the invention are possible, but it is thought the principle and operation of the invention will be fully understood from the foregoing, and while I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device of the kind described, in combination with a fixed member and an adjacently mounted movable member adapted for travel in a curved path, a resilient arm secured at one end to the fixed member with the free end thereof directed towards the movable member and disposed laterally of the line of travel of the movable member, a lock pin upon the movable member and projecting laterally therefrom towards the extended axis of the fixed member, a lock plate rigidly mounted upon the free end of the resilient fixed member, the said plate being so angularly shaped and recessed at its margins as to force the travel of the said pin in one direction over one edge of the said plate and its return over the opposite edge of the said plate, and an interrupter hook upon the said lock plate and so arranged as to temporarily impede the travel of the said lock pin over said plate.

2. In a device of the kind described, embodying a resilient arm fixedly supported at one end and having at the free end a lock plate vertically disposed laterally of the path of travel of another and movable element, there being a pin extended from said movable element adapted to impinge upon the said plate during the travel of the movable element, the said plate being so shaped and disposed that the said pin will impinge upon the upper edge thereof upon the initial forward movement of the movable element and will depress the plate during its travel thereover to and over the opposite forward edge of the plate, the said plate being recessed at its forward edge to engage the said pin, the provision of means for temporarily interrupting the forward movement of the said pin as it passes off the forward edge of the plate, the said means comprising a hook fixedly supported in a laterally offset position relative to the said lock plate and so arranged as to engage the said pin upon its forward movement over and off of the upper edge of the lock plate for directing the pin into the said recess of the lock plate.

In testimony whereof, I affix my signature.

BENHARD G. BUSS.